(12) United States Patent
Bergquist et al.

(10) Patent No.: US 10,833,602 B2
(45) Date of Patent: Nov. 10, 2020

(54) COMMON LINE COMMUNICATION IN CASCADED INVERTERS

(71) Applicant: ABB Schweiz AG, Baden (CH)

(72) Inventors: Gustav Bergquist, Stockholm (SE); Tomas Modeer, Stockholm (SE); Anders Lindgren, Stockholm (SE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 15/777,545

(22) PCT Filed: Nov. 11, 2016

(86) PCT No.: PCT/SE2016/051113
§ 371 (c)(1),
(2) Date: May 18, 2018

(87) PCT Pub. No.: WO2017/086862
PCT Pub. Date: May 26, 2017

(65) Prior Publication Data
US 2018/0337614 A1 Nov. 22, 2018

(30) Foreign Application Priority Data

Nov. 18, 2015 (SE) ...................................... 1551492

(51) Int. Cl.
*H02M 7/49* (2007.01)
*H04B 3/54* (2006.01)
(Continued)

(52) U.S. Cl.
CPC ............ *H02M 7/49* (2013.01); *H02M 7/483* (2013.01); *H02M 7/5387* (2013.01); *H04B 3/54* (2013.01);
(Continued)

(58) Field of Classification Search
CPC ............ H02M 7/00; H02M 7/42; H02M 7/44; H02M 7/48; H02M 7/483; H02M 7/49;
(Continued)

(56) References Cited

U.S. PATENT DOCUMENTS 8,860,242 B1 * 10/2014 Pruett ...................... H02J 4/00
307/5
2006/0077046 A1 4/2006 Endo
(Continued)

FOREIGN PATENT DOCUMENTS

CN 101262178 A 9/2008
EP 2725678 A1 4/2014
(Continued)

OTHER PUBLICATIONS

International Search Report and Written Opinion for International Application No. PCT/SE2016/051113, dated Feb. 14, 2017, 8 pages.
(Continued)

*Primary Examiner* — Thienvu V Tran
*Assistant Examiner* — Carlos O Rivera-Perez
(74) *Attorney, Agent, or Firm* — Brake Hughes Bellermann LLP

(57) ABSTRACT

A method in a power inverter system (100) is disclosed, wherein the power inverter system comprises a central unit (130) and a plurality of switching units (110) operable in an inverter mode in which they are individually switched so as to produce a combined output voltage waveform and AC ($V_{OUT}$) transmitted in a common line (120), and operable in a communication mode in which the switching units are switched so as to produce a communication signal, the communication signal being transmitted in the common line to the central unit. The method comprises operating at least some of the switching units in the inverter mode such that they are switched in response to switching commands of a (Continued)

command signal produced by the central unit, and between two consecutive switching commands of the command signal, operating at least one of the switching units in the communication mode.

16 Claims, 3 Drawing Sheets

(51) Int. Cl.
*H02M 7/483* (2007.01)
*H02M 7/5387* (2007.01)

(52) U.S. Cl.
CPC ............ *H02M 2007/4835* (2013.01); *H04B 2203/5445* (2013.01)

(58) Field of Classification Search
CPC ........ H02M 7/497; H02M 7/501; H02M 7/53; H02M 7/537; H02M 7/5387; H02M 7/53871; H02M 7/53873; H02M 2007/4835; H02M 2001/0067; H02M 2001/007; H02M 2001/0077; H02M 2001/0025; H02M 7/487; H02M 2001/0012; H04B 3/156; H04B 3/54–58; H04B 3/542; H04B 3/546; H04B 3/548; H04B 2203/5429–5445; H04B 2203/5462–5495
USPC ... 363/15–17, 37, 40–43, 65, 71, 72, 95–99, 363/123, 131–139; 323/223–268, 323/271–275, 280, 282–285, 351; 375/286–294; 340/310.11, 310.12, 340/310.13, 310.14, 310.15, 310.16, 340/310.17, 310.18

See application file for complete search history.

(56) References Cited

U.S. PATENT DOCUMENTS

| | | |
|---|---|---|
| 2011/0222595 A1 | 9/2011 | Choi et al. |
| 2013/0070494 A1 | 3/2013 | Rotzoll |
| 2013/0181527 A1 | 7/2013 | Bhowmik |
| 2014/0191583 A1* | 7/2014 | Chisenga .................. H02J 1/10 307/82 |
| 2014/0268958 A1* | 9/2014 | Chapman ................ H02J 3/383 363/97 |

FOREIGN PATENT DOCUMENTS

| | | | |
|---|---|---|---|
| EP | 2852069 A1 | 3/2015 | |
| WO | 2011008701 A2 | 1/2011 | |
| WO | 2013/030236 A2 | 3/2013 | |
| WO | 2013031320 A1 | 3/2013 | |
| WO | WO-2013030236 A2 * | 3/2013 | ............. H02J 3/383 |
| WO | 2013094721 A1 | 6/2013 | |
| WO | 2014/131734 A1 | 9/2014 | |

OTHER PUBLICATIONS

English translation Office Action for Japanese Application No. 2018-524422, dated Mar. 12, 2019, 4 pages.

Office Action for Chinese Application No. 201680066878.2, dated Nov. 21, 2019, along with English translation, 26 pages.

* cited by examiner und designating the U.S., which claims priority
COMMON LINE COMMUNICATION IN CASCADED INVERTERS

CROSS REFERENCE TO RELATED APPLICATION

This application is a 35 U.S.C. § 371 National Phase Entry Application from PCT/SE2016/051113, filed on Nov. 11, 2016, and designating the U.S., which claims priority under 35 U.S.C. § 119 to Swedish Patent Application No. 11551492-0, filed on Nov. 18, 2015, the disclosures of which are incorporated herein in their entireties by reference.

TECHNICAL FIELD

The invention disclosed herein relates to communication in power inverter systems. More precisely, it relates to a method of communicating with controlled cascaded switching units arranged to receive an input power and to deliver a combined output voltage waveform and alternating current to for example a power grid.

BACKGROUND

Switching units are widely used in power inverter systems for changing direct current (DC) to alternating current (AC). In such applications, a plurality of switching units can be combined in series to form a combined, multilevel output voltage waveform.

Numerous configurations and methods of operating the switching units have been proposed and used within this concept. In one example, the switching units may be electrically connected in cascade configuration to provide a desired combined output voltage waveform and AC. The individual operation of the switching units may e.g. be effectuated by means of a switch control circuitry, which requires transmission of information between the units of the system. In e.g. WO2014/131734 and PCT/EP2012/066782 control signals are transferred between a central adaptation unit and switching units by means of a wireless communication channel.

Although there are methods well known for such a communication channels to be implemented, there is still a need for alternative and improved methods for transferring information in connection with such power inverter systems in a cost and energy efficient way.

SUMMARY

An object of at least some of the embodiments of the present invention is to provide methods in a power inverter system, switching units and a central unit, and in particular to provide an improved alternative to the above techniques.

Accordingly, the invention provides methods, devices and a system with the features of the independent claims. The dependent claims define advantageous embodiments.

In a first aspect, a method in a power inverter system is provided. The power inverter system comprises a plurality of switching units that are electrically connected to each other in cascade configuration. Each of the switching units is adapted to receive a respective input power. Further, each of the switching units is operable in an inverter mode in which the switching units are individually switched so as to produce a combined output voltage waveform, and a communication mode in which the switching units are switched so as to produce a communication signal. The combined output voltage from the switching units and the communication signal may be transferred on the same wire or line. According to the present aspect, at least some of the switching units are in the inverter mode switched in response to switching commands of a command signal and/or other types of information provided by e.g. a data signal. Further, at least one of the switching units is operated in the communication mode during a period of time defined by two consecutive switching commands of the command signal.

According to a second aspect, a method in a central unit is provided. The method comprises the steps of receiving, via a common line adapted to transferring both power and communication data, a communication signal generated by a switching unit operating in a communication mode, calculating a command signal based on the received communication signal, and outputting the command signal via the common line. The switching unit is one of a plurality of switching units electrically connected in cascade configuration, wherein each one of the plurality of switching units is adapted to receive a respective input DC power and operable in an inverter mode and a communication mode. In the inverter mode the switching units are individually switched in response to switching commands of the command signal so as to produce a combined output voltage waveform and current transferred on the common line. In the communication mode, in which the switching units are operable between two consecutive switching commands of the command signal, the switching units are switched to produce the communication signal.

According to a third aspect, a power inverter system is provided comprising a plurality of switching units electrically connected in cascade configuration. Each one of the plurality of switching units is adapted to receive a respective input DC power and operable in an inverter mode in which the switching units are individually switched in response to switching commands of a command signal so as to produce a combined output voltage and current waveform transferred on a common line. Further, the switching units are operable, between two consecutive switching commands of the command signal, in a communication mode in which the switching units are switched so as to produce a communication signal, wherein the communication signal is transmitted in the common line.

According to a fourth aspect, a central unit is provided which is adapted to receive, via a common line, a communication signal generated by a switching unit according to the third aspect. The communication signal is processed by a processor adapted to calculate a command signal based on the received communication signal. The central unit further comprises a communication interface through which the command signal is output to the common line.

According to a fifth aspect, a system is provided comprising a power inverter system according to the third aspect and a central unit according to the fourth aspect.

The present aspects make use of an understanding that the multilevel output voltage waveform can be built up and designed so there are "silent" periods where the voltage is relatively constant and has a relatively low harmonic content. Those "silent" periods may be located between two consecutive switching events of the switching units. These "silent" periods may be utilized for transmitting a superimposed communication signal on the combined output and with a relatively low harmonic content (i.e., noise) that otherwise may be caused by level transients. The communication signal may be achieved by switching one or several of the switching units while letting the remaining switching units be silent, i.e., remain in its present state as the communication signal is generated.

The switching units may, in other words, be considered to operate in two different modes—the inverter mode generating the combined multilevel output voltage and current waveform and at the same time be able to receive the communication signal and the communication mode generating the communication signal. In the inverter mode each or at least some of the switching units may be switched based on switching commands of the command signal so as to form a desired multilevel output voltage and current waveform and simultaneously be able to receive communication data and commands from the central unit. The period defined by two mutually adjacent switching commands may be referred to as a silent period of the multilevel output AC, as the output may be relatively stable or constant during this period. In other words, the output voltage may during this silent period have a relatively low noise, which is particularly advantageous in connection with signaling as a relatively low level of noise may reduce the need for filtering and amplification of the communication signal. In this silent period, one or several of the switching units may be operated in the communication mode, in which they may be switched a plurality of times to generate a superimposed communication signal. Preferably, the switching units may be operated at a relatively low switching frequency in the inverter mode as compared to commonly known topologies where a high frequency is used and desired in order to reduce the size of filter components. By operating the power inverter system at relatively low frequencies, relatively long periods between consecutive switching events may be available for generation and transmission of the communication signal. Further, a lower switching frequency may allow for reduced switching losses and hence an inverter with increased efficiency.

The command signal may e.g. comprise a state command causing a switching unit to output or receive power, and preferably to output a voltage at a certain level (positive, zero, negative or voltages there between). Additionally, or alternatively, the state command may cause the switching unit to cease outputting power and voltage. The command signal may also comprise further or alternative commands causing the switching units to output any combination of two or more of a positive voltage, a negative voltage, zero voltage and voltages there between. This also applies when operated in the communication mode, wherein the switching unit may alternate between any of the above mentioned outputs.

Each one of the plurality of switching units may be adapted to receive, via the common line, a communication signal generated by another switching unit or the central unit. The communication signal may be processed by a processor adapted to calculate a command signal based on the received communication signal.

By using the common line for signaling a number of advantages may be achieved. For instance, the need for separate communication channels is eliminated. Additional cabling or wireless communication means may therefore be omitted. Further, by using an existing power stage in the switching units there is no need for an additional communication stage or transmitter for generating the communication signal. Instead the same equipment generating the output voltage waveform and providing the power conversion can be used for the additional purpose of communication, which allows for a reduced bill of material, size and cost related to e.g. manufacturing and maintenance.

The communication signal may comprise information relating to voltages or currents in the system, such as the level of DC input to the switching unit or the level of output AC, and other parameters relating to e.g. temperature, capability and performance of the switching unit.

The central unit may use information in the communication signal when determining or calculating the command signal. Information regarding the current state or operation of the inverter system or its input may hence be used as feedback for controlling the inverter system.

The central unit may further be adapted to receive information representing at least one of frequency, phase, amplitude and harmonics of a required AC, such as e.g. a grid AC, and to receive information, via the communication signal, representing at least one of input current and input voltage to each one, or at least some, of the switching units. Based on the received information, the switching units may be individually controlled such that the combined output from the plurality of switching units produces a voltage and current waveform matching the required voltage and current waveform.

The individual control of the switching units is particularly relevant for applications and systems wherein the respective input DC power varies over time and/or is difficult to predict. This may be the case in for e.g. photovoltaic (PV) elements or solar panels, wherein the output power may be determined by a non-linear relationship between voltage and current of the DC input. Events like a passing shadow, or differences in panel performance due to pollution, differential aging or differences during manufacturing may hinder an array of panels as whole to operate at its peak efficiency point. The present aspects provide a solution wherein each panel may be connected to a respective switching unit that is cascaded and can be individually operated in response to the input DC power from each one of the panels. Information about the input DC power may be transferred by the communication signal to the central unit, wherein a micro-controller or processor may be provided to generate a suitable command signal indicating a switching pattern to be used by the switching units.

The present aspects further allow for individual input DC power sources, such as e.g. solar panels, to be monitored. Monitoring energy production (i.e. produced input DC power, voltage and/or current) may e.g. give an operator or maintenance personnel an early indication regarding need for maintenance, resulting in better utilization of the equipment. The monitoring may be accomplished by means of the communication signal, which may be transmitted to the central unit for further analysis.

According to an embodiment, the communication signal further comprises an identifier indicating an identity of the switching unit producing the communication signal. The central unit may thereby be able to distinguish between individual switching units and hence to adapt the command signal accordingly.

According to an embodiment, each one of the switching units may comprise a sensor adapted to receive the command signal and/or the communication signal. The sensor may, in case of a current being the main information carrier for, e.g. comprise means for sensing changes in current, for example a signal transformer, a current transformer, a shunt resistor or a Hall-effect measurement device. Further, one or several of the power stage transistors on-resistance or conduction voltage drop may be used for sensing the communication signal. The communication signal may, in case of the main information carrier being a voltage, be determined by means of a sensing device detecting changes in voltage. Such a sensing device may e.g. utilize resistive voltage dividers combined with AC coupling in the form of e.g. capacitors.

Alternatively, or additionally, the sensor may comprise a common mode inductor having a core with a first winding and a second winding, wherein the first winding and the second winding forms a differential pair of conductors arranged to convey a differential communication signal. Such a common mode inductor may comprise a third winding arranged to extend along at least a portion of the first winding and a fourth winding arranged to extend along at least a portion of the second winding. The third winding and the fourth winding may be inductively coupled to the first winding and the second winding, respectively, and be connected in series with each other so as to provide a sensor signal induced by the differential communication signal in the first winding and the second winding.

According to some embodiments, the central unit may comprise communication interface adapted to output the command signal and/or to receive the communication signal. The communication interface may e.g. comprise a transmitter having a switching unit which may be similarly configured as the one already discussed. Such a switching unit may be adapted to generate a signal, such as a command signal, in the silent periods between two switching commands. Alternatively, or additionally, the communication interface may according to some embodiments comprise a sensor, such as e.g. a transformer, resistor, a Hall-effect measurement device, or a transistor as mentioned above, for receiving and determining the communication signal. Further, a common mode inductor with an additional sensor winding as described above may be used.

A switching unit may, in the context of the present application, refer to an electric component capable of receiving input DC power and producing a multilevel output of at least two different voltage levels or more. The switching unit may also be referred to as a DC/AC converter and may e.g. be formed of an H-bridge or half bridge converter. The H-bridge converter may e.g. comprise four metal oxide semiconductor field effect transistors (MOSFETs) or any other type of semiconductor switch or transistor. The half bridge converter may e.g. comprise two transistors.

It will also be appreciated that the present aspects may be implemented in, or realized as a high-power transmission system.

The present aspects may be embodied as computer-readable instructions for controlling a programmable computer in such manner that it performs the method outlined above. Such instructions may be distributed in the form of a computer-program product comprising a computer-readable medium storing the instructions. In particular, the instructions may be loaded in a micro-controller or control device such as for example FPGA, ASIC, CPU, MCU of the central unit.

Further objectives of, features of and advantages with the present aspects will become apparent when studying the following detailed disclosure, the drawings and the appended claims. Those skilled in the art realize that different features of the present aspects, even if recited in different claims, can be combined in embodiments other than those described in the following.

BRIEF DESCRIPTION OF THE DRAWINGS

The above, as well as additional objects, features and advantages of the present invention, will be better understood through the following illustrative and non-limiting detailed description of embodiments of the present invention. Reference will be made to the appended drawings, on which.

All the figures are schematic and generally only show parts which are necessary in order to elucidate the invention, whereas other parts may be omitted or merely suggested.

DETAILED DESCRIPTION OF EMBODIMENTS

Figure 1:
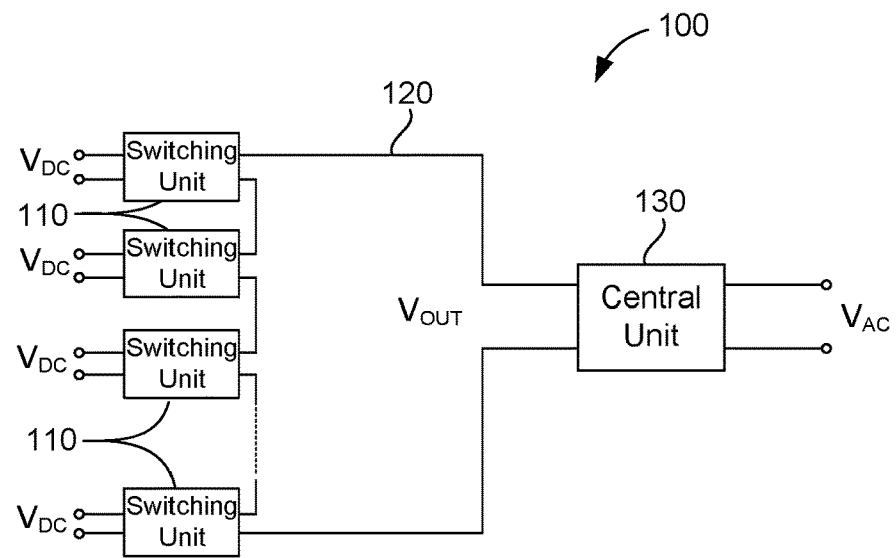
FIG. 1 graphically illustrates a power inverter system comprising a plurality of cascaded switching units, and a central unit according to some embodiments.

FIG. 1 shows a power inverter system 100 and a central unit 130 according to an embodiment. The power inverter system 100 comprises a plurality of switching units, such as e.g. H-bridge converters 110, each being arranged to be supplied with an input DC power source voltage $V_{DC}$ from a respective source, such as e.g. a photovoltaic element (not shown in FIG. 1). The H-bridge converters 110 may be cascaded to produce a multilevel output voltage $V_{OUT}$, which may be fed via the common line 120 to the central unit 130. The central unit 130 may be adapted to output a voltage $V_{AC}$ matching e.g. the grid alternating voltage and feed an output current $I_{AC}$ to e.g. the grid. In case of the input voltage sources being photovoltaic panels, each H-bridge converter 110 may be integrated in e.g. a junction box of the respective panel. Further, a central adaptation unit may be provided (not shown) for adapting the combined multilevel output voltage waveform such that a voltage similar to the grid voltage $V_{AC}$ is output from the system. The central adaptation unit may e.g. be realized by means of an inductor for taking up a possible voltage mismatch between the system and the grid voltage $V_{AC}$, and to provide an impedance which may be used for controlling and stabilizing the output current.

Each one of the switching units 110 may be adapted to operate in a communication mode wherein silent periods of the combined output voltage waveform $V_{OUT}$, i.e., in periods where no switching occurs, are utilized for generating a communication signal. The communication signal may be superimposed on the combined output voltage waveform $V_{OUT}$ and transmitted via the common line 120 to the central unit 130.

Further, the central unit 130 may be adapted to generate a command signal for controlling the operation of the H-bridges 110. The command signal may be generated in a similar way as the communication signal, i.e., by means of a switching unit (not shown) switching during a silent period of the combined output voltage waveform $V_{OUT}$.

The communication signal may e.g. comprise information indicating a current level or voltage level of the input $V_{DC}$ at the respective switching unit 110. Further, the communication signal may comprise an identifier indicating the identity of the switching unit 110 generating the communication signal. This information and/or other information may be used at the central unit 130 for controlling the operation of the power inverter system 100.

Figure 2:
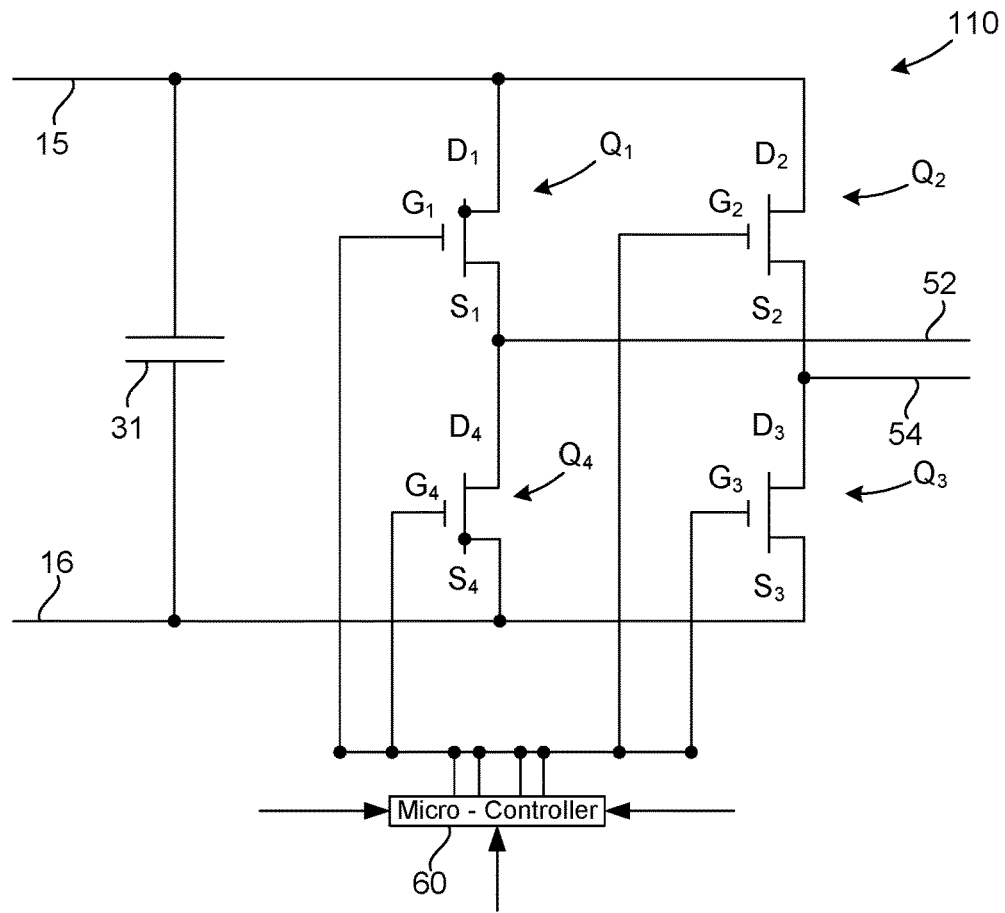
FIG. 2 shows a switching unit according to an embodiment of the present invention.

FIG. 2 shows an exemplifying embodiment of a switching unit 110 according to the embodiment discussed with reference to FIG. 1. More specifically, a circuit diagram of an H-bridge converter 21, comprising four switching elements Q1, Q2, Q3, Q4 in the form of four metal oxide semiconductor field effect transistors (MOSFETs) Q1, Q2, Q3, Q4, is shown. However, any other appropriate switching element may be used, such as insulated gate bipolar transistors (IGBTs), or bipolar junction transistors (BJTs).

The drain D1 of the first transistor Q1 and the drain D2 of the second transistor Q2 may be electrically connected to a positive pole 15 of an input DC power source, such as e.g. photovoltaic panel (not shown), while the sources S1 and S2 of the respective first and second transistors Q1 and Q2 may be electrically connected to the drains D4 and D3 of the fourth and third transistors Q4, Q3, respectively. The sources S3 and S4 of the third and fourth transistors Q4, Q3 may be electrically connected to a negative pole 43 of the input DC power source. The source S1 of the first transistor Q1 may be electrically connected to the drain D4 of the fourth transistor Q4 at a first output terminal 52, whereas the source S2 of the second transistor Q2 is electrically connected to the drain D3 of the third transistor Q3 at a second output terminal 54.

The gate terminals G1, G2, G3, G4 of the four transistors Q1, Q2, Q3, Q4 may be electrically connected to a switch control circuitry 60 adapted to control the MOSFETs Q1, Q2, Q3, Q4 by supplying a gate voltage to their respective gates G1, G2, G3, G4. The switch control circuitry may comprise a micro-controller or computing unit 60, e.g. mounted on a printed circuit board (not shown) along with the switching unit 110. The micro-controller or computing unit 60 may also be connected to e.g. current and/or voltage meters (not shown) providing the micro-controller with information on the input voltage and current, the combined output from the power inverter system 100 and/or a required AC voltage waveform or current.

The micro-controller 60 may be adapted to operate the switching units 110 in the inverter mode in such manner that the combined output from the plurality of switching units 110 of the power inverter system 100 produces a combined multilevel voltage waveform matching the required voltage waveform. Further, the micro-controller 60 may operate the switching unit 110 in the communication mode, wherein the switching unit 110, in a silent period between two consecutive switching events of any of the plurality of switching units 110, may produce a communication signal. This may be achieved by means of the micro-controller 60, which may operate the switching units Q1, Q2, Q3, Q4 so as to generate an output forming the desired communication signal. The micro-controller 60 may be configured to receive the command signal from the central unit (not shown in FIG. 2) and operate the switching unit accordingly in the inverter mode. The command signal may e.g. be received by means of a receiving circuitry or sensor comprising e.g. an AC coupled transformer, a current transformer, a shunt resistor, a Hall-effect measurement device, or a conduction voltage drop over a transistor (not shown).

Figure 3:
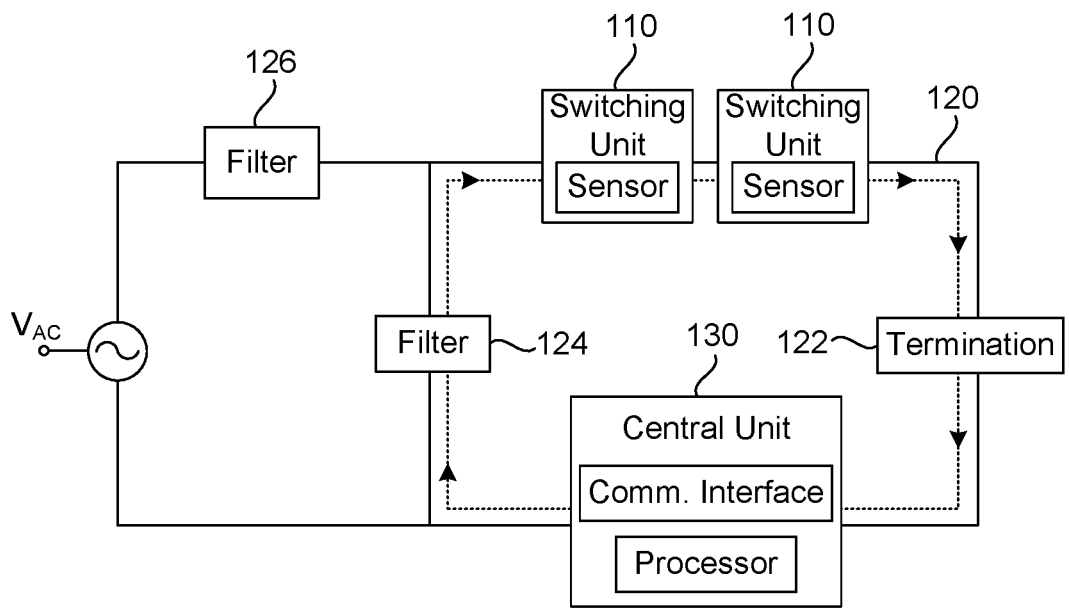
FIG. 3 schematically illustrates the layout of a system and its associated signaling paths according to an embodiment.

FIG. 3 shows a power inverter system and a central unit that may be similarly configured as the power inverter system and central unit discussed with reference to FIGS. 1 and 2. The power inverter system 100 may comprise a plurality of cascaded switching units 110 that are connected to a central unit 130 that may be adapted to receive the communication signal generated by the power inverter system 100 and to transmit a command signal controlling operation of the power inverter system 100. As indicated in FIG. 3, there might also be provided further components, such as e.g. a terminator 122 for reducing reflections of the communication signal in the common line 120. Further components may be e.g. a filter 126 for filtering the output before it is output to e.g. the grid, and a filter 124 that is arranged in the central unit 130 so as to filter the command signal. The filters 124, 126 may be structurally integrated in the central unit 130.

In FIG. 3 the communication signal and the command signal are represented by a dashed line, wherein arrows are provided to schematically indicate the path of the signals during operation of the power inverter system 100 and central unit 130. As indicated, the communication signal and the command signal may circulate from the switching units 110 of the power inverter system 100, via the common line 120 to the central unit 130, from which the command signal (which may be based in the communication signal) may be output/returned to the switching units 110. The combined output voltage waveform $V_{OUT}$ may be transmitted in the same common line 120 as the communication signal and/or the command signal, but may be further transmitted as an output AC $V_{AC}$ to e.g. the grid.

Figure 4:
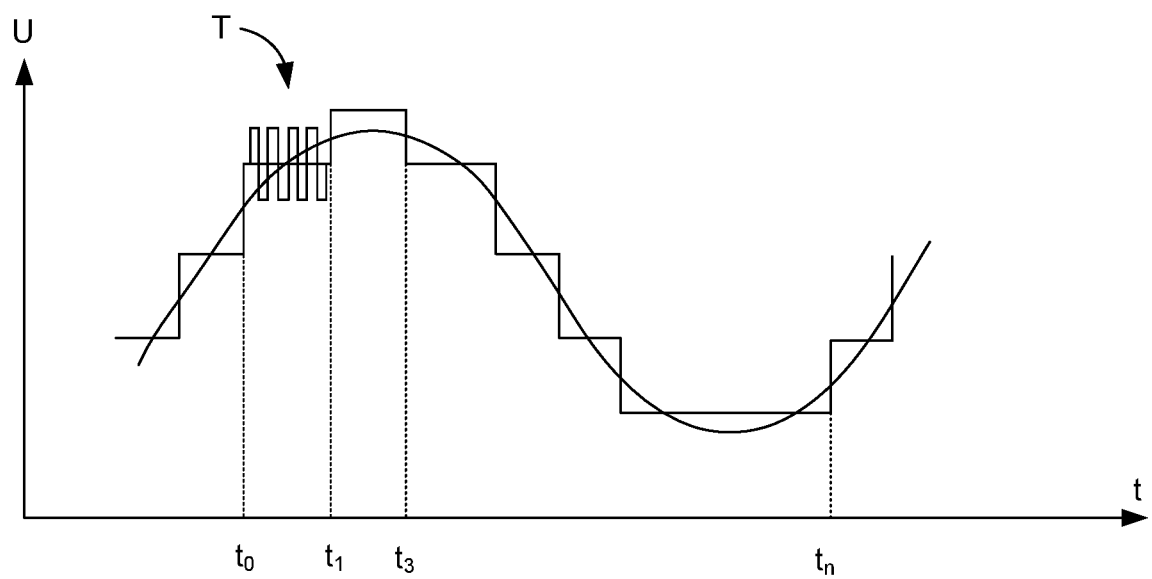
FIG. 4 is a diagram illustrating the combined multilevel output voltage waveform according to an embodiment.

FIG. 4 is a diagram illustrating a combined multilevel output voltage waveform $V_{OUT}$ from a power inverter system that may be similarly configured as the power inverter systems described with reference to any one of FIGS. 1 to 3. In the diagram, the combined output voltage waveform $V_{OUT}$ is indicated as a voltage, U (vertical axis) as a function of time t (horizontal axis). In the present, illustrative example 12 cascaded switching units are used to generate a combined multilevel output voltage waveform $V_{OUT}$ matching a desired sinusoidal voltage waveform $V_{AC}$ after filtering. The switching events of the switching units are indicated by $t_0, t_1, \ldots t_n$ on the horizontal axis and may correspond to switching commands of the command signal, causing the switching units to switch between different output levels. The silent periods that can be used for signaling are schematically represented by the flat steps between two consecutive switching commands or switching events $t_n, t_{n+1}$. In the present figure, the communication signal is generated during silent period T between switching events $t_0$ and $t_1$. The signal may e.g. be generated by operating one of the switching units in the communication mode during that period, i.e., by switching the switching unit a plurality of times between $t_0$ and $t_1$. The communication signal may hence be superimposed on the combined multi-level output.

Figure 5:
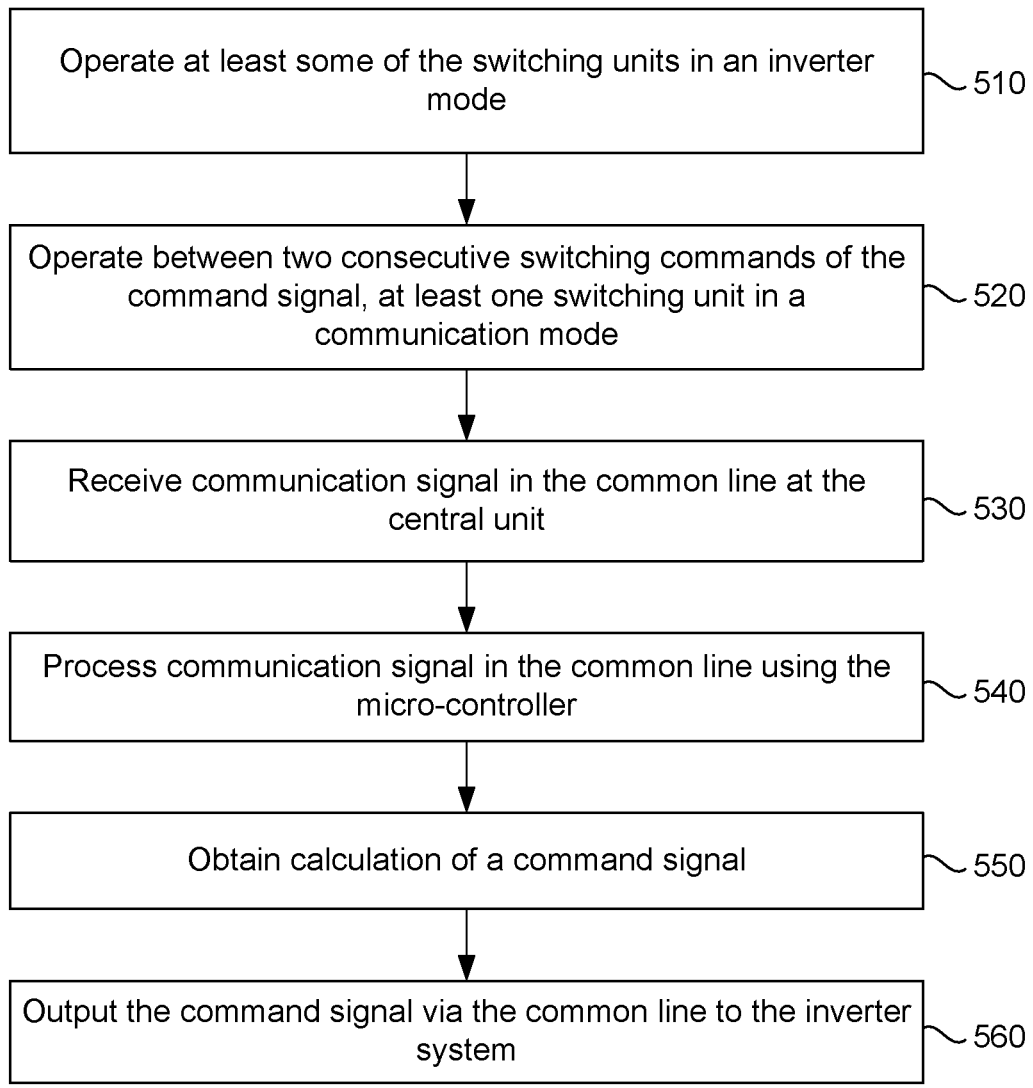
FIG. 5 illustrates the outline of a method in a power inverter system and a central unit according to an embodiment of the present invention.

With reference to FIG. 5, there is shown a schematic outline of a method according to an embodiment of the present invention, wherein a power inverter system comprising plurality of switching units in cascade configuration is controlled so as to generate a communication signal and a combined multilevel output voltage waveform and AC on the same line. The method will in this example be discussed with reference to a power inverter system and a central unit similarly configured as the embodiments discussed in connection with FIGS. 1 to 4.

The method comprises operating 510 at least some of the switching units in an inverter mode in which the switching units are individually switched in response to switching commands of a command signal so as to produce a combined output voltage waveform transferred on the common line. Further, the method comprises operating 520, between two consecutive switching commands of the command signal, at least one switching unit in a communication mode in which the switching unit is switched so as to produce the communication signal, wherein the communication signal is transmitted in the common line. At the central unit, the communication signal in the common line may be received 530 and processed 540 by e.g. a micro-controller, resulting in the calculation 550 of a command signal that may be based on the received information. The command signal may be output 560, via the common line, to the inverter system.

As outlined above, the method illustrated by FIG. 5 may be embodied as computer-executable instructions distributed and used in the form of a computer-program product including a computer readable medium storing such instructions. By way of example, computer-readable media may comprise computer storage media and communication media. As is well known to a person skilled in the art, computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices. Further, it is known to the skilled person that communication media typically embodies computer readable instructions, data structures, program modules or other data in a modulated data signal such as a carrier wave or other transport mechanism and includes any information delivery media.

The invention claimed is:

1. A method in a power inverter system, comprising:
   outputting, from a central unit, a command signal comprising switching commands;
   receiving the command signal at a plurality of switching units electrically connected in cascade configuration and adapted to receive a respective input DC power source voltage ($V_{DC}$), each of the plurality of switching units including a bridge converter;
   operating at least some of the switching units in an inverter mode in which the bridge converters of the switching units are individually switched to produce a combined multilevel output voltage waveform ($V_{OUT}$) that switches between different output levels, based on the switching commands, so that $V_{OUT}$ matches a desired sinusoidal voltage waveform ($V_{AC}$) after filtering;
   during a silent period characterized as a flat step in $V_{OUT}$ between two consecutive switching commands of the command signal, operating at least one of the switching units in a communication mode in which the bridge converters of the at least one the switching units are switched a plurality of times between the two consecutive switching commands to produce a communication signal;
   outputting the communication signal superimposed on $V_{OUT}$ to a common line; and
   receiving, at the central unit, the communication signal.

2. The method according to claim 1, wherein the communication signal received at the central unit is used as feedback for producing the command signal.

3. The method according to claim 1, wherein the communication signal comprises an identifier indicating an identity of the switching unit producing said communication signal.

4. The method according to claim 1, wherein the bridge converters of the switching units are switched between the different output levels in at least one of the inverter mode or the communication mode.

5. The method according to claim 4, wherein the bridge converters of the switching units are switched between a positive voltage level and a negative voltage level in at least one of the inverter mode or the communication mode.

6. The method according to claim 4, wherein the bridge converters of the switching units are switched between a positive voltage level, a zero voltage level and a negative voltage level in the inverter mode and/or the communication mode.

7. The method according to claim 1, wherein each output level of the combined multilevel output voltage waveform is formed by an output from one of the switching units or a sum of outputs from several of the switching units.

8. The method according to claim 1, wherein the silent period between the two consecutive switching commands is configured to allow for a predetermined amount of data to be output from the power inverter system.

9. The method according to claim 1, further comprising determining the communication signal by measuring a voltage difference or electrical current.

10. A power inverter system comprising a central unit and a plurality of switching units electrically connected in cascade configuration, each switching unit including a bridge converter, wherein:
    the central unit is adapted to receive, via common line, a communication signal and to output, to the common line, a command signal comprising switching commands; and
    wherein each one of the plurality of switching units is:
    adapted to receive a respective input DC power;
    operable in an inverter mode in which the bridge converters of the switching units are individually switched in response to the switching commands of the command signal so as to produce a combined multilevel output voltage waveform ($V_{OUT}$) that switches between different output levels, based on the switching commands, so that $V_{OUT}$ matches a desired sinusoid voltage waveform ($V_{AC}$) after filtering; and
    operable, during a silent period characterized as a flat step in $V_{OUT}$ between two consecutive switching commands of the command signal, in a communication mode in which the bridge converters of the switching units are switched a plurality of times so as to produce the communication signal, the communication signal superimposed on $V_{OUT}$ and transmitted in the common line.

11. The power inverter system according to claim 10, wherein the bridge converters are H-bridge converters.

12. The power inverter system according to claim 11, wherein each one of the plurality of switching units is adapted to be operatively connected to a respective photovoltaic panel adapted to provide the input DC power.

13. The power inverter system according to claim 10, wherein each switching unit comprises a sensor adapted to receive the command signal.

14. The power inverter system according to claim 10, wherein the central unit further comprises:
    a processor adapted to calculate the command signal based on the received communication signal; and
    a communication interface adapted to output said command signal to the common line.

15. The power inverter system according to claim 10, further comprising a sensor adapted to determine the communication signal.

16. The power inverter system according to claim 15, wherein the sensor comprises at least one of an AC coupled transformer, a current transformer, a shunt resistor, a Hall-effect measurement device or a conduction transistor.

\* \* \* \* \*